Dec. 27, 1960　　　E. C. WEISKOPF　　　2,966,177
MOVABLE WORK CARRIERS AND SAW GUARDS MOUNTED
THEREON FOR POWER OPERATED SAWS
Filed March 17, 1959
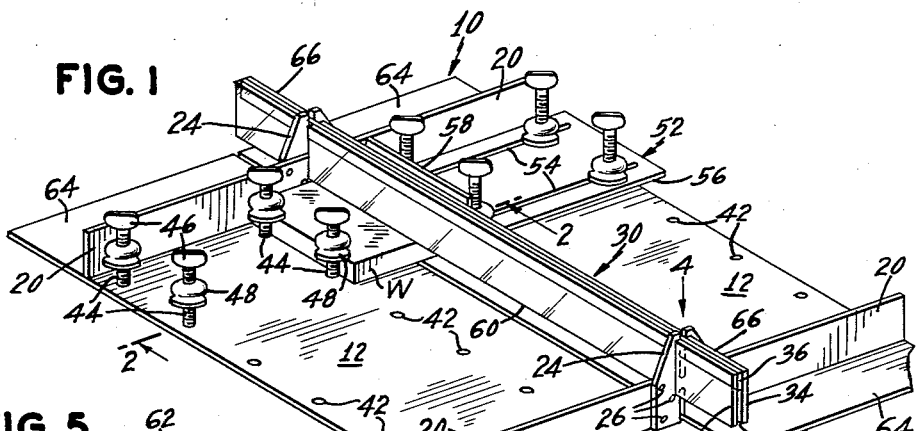
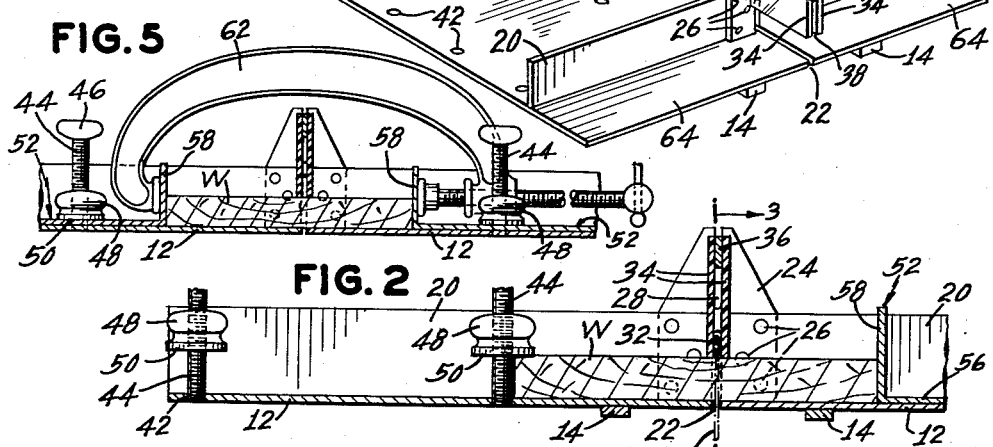
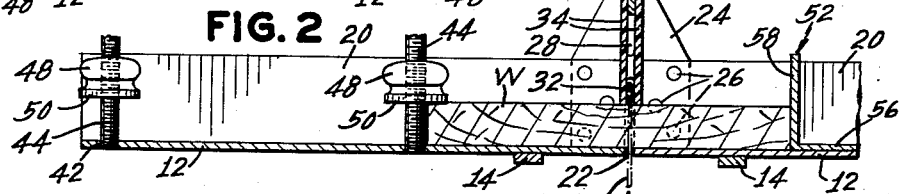
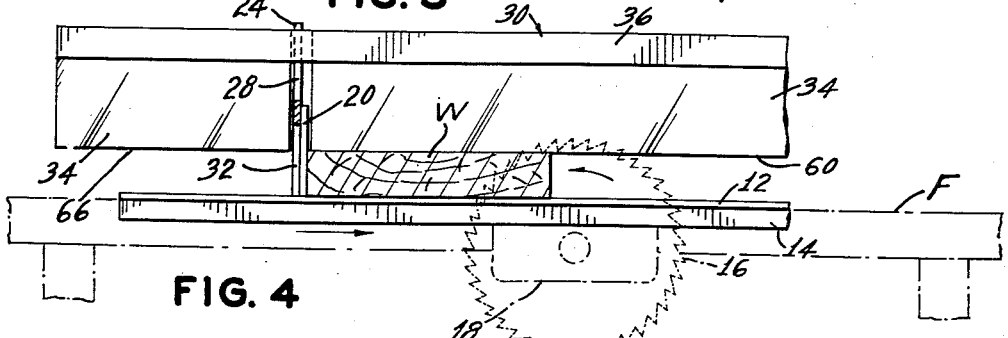
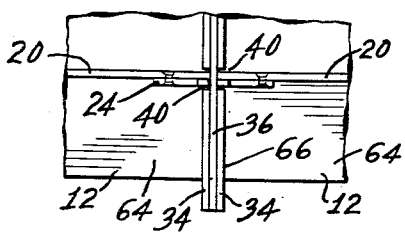
INVENTOR.
Edwin C. Weiskopf
BY
ATTORNEYS

# United States Patent Office 2,966,177
Patented Dec. 27, 1960

2,966,177

MOVABLE WORK CARRIERS AND SAW GUARDS MOUNTED THEREON FOR POWER OPERATED SAWS

Edwin C. Weiskopf, Brewster, N.Y., assignor to The Technicon Company, Inc., Chauncey, N.Y., a corporation of New York Filed Mar. 17, 1959, Ser. No. 799,903

14 Claims. (Cl. 143—52)

This invention relates to power operated saws and, more particularly, to work carriers and saw guards therefor.

One of the objects of the present invention is the provision of an improved work carrier having a saw guard mounted thereon and movable therewith relative to a power operated saw.

Another object of the present invention is the provision of an improved work carrier and saw guard for power operated saws wherein accidental contact of the operator with the saw is prevented during the cutting operation of the saw.

A further object of the present invention is the provision of an improved work carrier for a power operated saw having hand grips thereon which will keep the operator's hands away from the vicinity of the saw during the manual movement of the work carrier relative thereto.

Another object of the present invention is the provision of an improved transparent saw guard mounted on a movable work carrier to permit the visual observation of the cutting of the work during the movement of the work carrier relative to the saw.

A further object of the present invention is the provision of improved means for securing work to a movable carrier for the subsequent sawing thereof.

The above and other objects, features and advantages of this invention will be more fully understood from the following description considered in connection with the accompanying illustrative drawings.

In the drawings:

Fig. 1 is a perspective view of a movable work carrier and saw guard mounted thereon embodying the present invention;

Fig. 2 is a fragmentary sectional view, on an enlarged scale, taken on line 2—2 of Fig. 1;

Fig. 3 is a fragmentary vertical view taken on line 3—3 of Fig. 2;

Fig. 4 is a fragmentary plan view, on an enlarged scale, taken in the direction of line 4 of Fig. 1; and Fig. 5 is a fragmentary view illustrating other means for securing the work to the work carrier.

Referring now to the drawings in detail, the movable work carrier 10 comprises a pair of base plates 12, each of said base plates being provided with a guide rail 14, which is adapted to be fitted in a guideway in a frame F, (Fig. 3), which supports a rotating power saw blade 16, for movement relative thereto, the bearing support for said saw being shown schematically at 18. Each base plate of the work carrier is provided, at each end thereof, with transversely extending vertical plates 20, each of said plates providing a hand grip for manually moving the work carrier 10 relative to the power operated saw for the cutting of the work W mounted on the work carrier. Plates 20 provide an edge against which work W may be placed and also define the boundaries on the base plates 12 between which the work may be secured to the work carrier. The base plates 12 are spaced from each other to define a slot 22, extending longitudinally thereof, to permit the passage of the saw 16 through the work carrier 10 for the cutting of the work W. The base plates are secured in said spaced relation by slotted members 24 which are fixed to plates 20, proximate each end of the work carrier, by securing elements 26. The work carrier may be used with one base plate 12 or both base plates, as shown in Fig. 1. To remove one base plate from the work carrier, the securing elements 26 for said base plate are removed from the respective slotted members 24, whereby said base plate will be disconnected from the other base plate.

Each of slotted members 24 is provided with an upper vertically extending slot or guide 28 for receiving one end of a saw guard 30, and a lower vertically extending slot 32 to permit the passage of the saw 16 therethrough. Saw guard 30 comprises a pair of longitudinally extending members 34 spaced from each other by a longitudinally extending member 36 disposed therebetween to define a longitudinally extending slot 38 through which saw 16 passes during the movement of the work carrier relative thereto for the cutting operation. Each of members 34 is preferably made from a transparent material, such as Plexiglas or Lucite, to permit the visual observation of the saw during the cutting of the work W. Vertical spaces 40 are provided in members 34, proximate each end thereof, to permit the mounting of the guard 30 in slotted members 24, as best seen in Figs. 1 and 4, the side edges defining slot 28 of slotted member 24 being in abutting sliding relation with the sides of member 36. From the foregoing it will be seen that guard 30 is mounted in slotted members 24 and is supported thereby for movement with work carrier 10. As will be more clearly understood hereinafter, guard 30 may be positioned at various vertical levels in slotted members 24, depending upon the thickness of the work W being sawed, the slots 28 acting as vertical guides for the guard in its rectilinear movement with respect to the work carrier 10.

To secure the work W to the base plates 12 of the work carrier, there is provided in said base plates a plurality of threaded holes 42 (Fig. 2) placed at varying positions therein for receiving a corresponding plurality of threaded rods 44, each of said rods being provided with a thumb gripping portion 46 to permit the easy screwing of said rods into said threaded holes. Each of the rods is provided with a clamping nut 48 having a flat lower surface 50 adapted to engage the upper surface of the work W for the securement thereof to the base plates 12 of the work carrier 10, as best seen in Figs. 1 and 2. Clamping nuts 48 and rods 44 may also be used to adjustably secure a gripping member or guide 52 to plates 12 of the work carrier. Each of the guide or gripping members 52 is L-shaped and has two longitudinally extending adjusting slots 54 in the horizontal leg 56 thereof, the vertical leg 58 thereof being in abutting relation with the side of the work W to act as a guide for the proper positioning of the work on the work carrier. Threaded rods 44 pass through adjusting slots 54 of the guide member to permit the adjustable securement of the guide member in various positions on the base plates of the work carrier, said guide member being secured to the work carrier by clamping nuts 48, as best shown in Fig. 1. It will be noted that with the work W secured in position on the work carrier, the lower edge 60 of saw guard 30 rests on the upper surface of the work and is supported thereby, the ends of the saw guard being mounted in vertical adjustable positions in the slotted members 24. Depending upon the thickness of the work W, the vertical position of the saw guard 30 in the slotted members 24 will be determined.

Referring now to Fig. 5, there is shown another means of securing the work W to the base plates of the work carrier using guide members 52 as gripping members. As shown in Fig. 5, the vertical legs 58 of gripping members 52 engage the work W along both sides thereof and a C-clamp 62 is provided which engages said vertical legs to hold the work W in the sawing position thereof. The gripping members 52 are secured to the base plates of the work carrier in the same manner as previously described by using clamping nuts 48.

The device operates in the following manner:

The work carrier 10 and the saw guard 30 mounted thereon are mounted in the guideways of frame F, which supports the rotating power saw blade 16, said saw passing through slot 22 of the work carrier, slots 32 of members 24, and being straddled by members 34 of saw guard 30 in the slot 38 thereof, as best seen in Fig. 2. The operator places his hands on the hand grip plates 20, at either end of the work carrier, for manually moving said work carrier and the saw guard mounted thereon relative to the rotating saw blade, the work having been previously secured to the work carrier with the clamping nuts 48 or the C-clamp 62 and guide members 52. As the saw passes through the work W in the cutting thereof, the upper part of said saw will be at all times covered by the saw guard 30, as shown in Fig. 3, thereby preventing the manual engagement of the rotating saw blade by the operator. In addition, since the operator engages the hand grip plates 20 for the manual actuation of the work carrier, the operator's hands should never be in the vicinity of the rotating saw blade. Both the base plates 12 and the saw guard 30 are provided with extending portions 64 and 66, respectively, at each end of the device, said portions extending past the hand grip plates 20 for guarding said saw as it moves past said hand grip portions during the cutting of the work. Suitable stops (not shown) are provided on the work carrier to engage frame F to prevent moving the work carrier too far so that the saw is exposed past the ends of the saw guard.

While I have shown and described the preferred embodiments of my invention, it will be understood that the invention may be embodied otherwise than as herein specifically illustrated or described, and that in the illustrated embodiments certain changes in the details of construction and in the form and arrangement of parts may be made without departing from the underlying idea or principles of this invention within the scope of the appended claims.

Having thus described my invention, what I claim and desire to secure by Letters Patent is:

1. A device adapted to be mounted for longitudinal movement relative to a rotating power operated saw, comprising a work supporting carrier having means permitting the passage of the saw therethrough for the cutting of the work supported thereon, a guard for said saw comprising an elongated member coextensive with said carrier, and means for slidably guiding said guard into varying vertical positions on said carrier for movement therewith longitudinally of said saw, said slidably guiding means comprising a pair of slotted members mounted in spaced relation on said carrier for vertically guiding said elongated member proximate the ends thereof, said elongated member being in abutting relation with the work on said carrier and being supported by the work when said work is supported on said carrier, said elongated member comprising means enclosing the upper part of said saw during the entire movement of said carrier relative thereto to prevent accidental manual access to said saw during said movement.

2. A device adapted to be mounted for longitudinal movement relative to a rotating power operated saw, comprising a work supporting carrier having means permitting the passage of the saw therethrough for the cutting of the work supported thereon, a guard for said saw comprising a pair of elongated transparent members in spaced relation to each other and coextensive with said carrier, and means for slidably guiding said guard into varying vertical positions on said carrier for movement therewith longitudinally of said saw, said slidably guiding means comprising a pair of slotted members mounted in spaced relation on said carrier for vertically guiding said elongated members proximate the ends thereof, said elongated members being in abutting relation with the work on said carrier and being supported by said work when said work is supported on said carrier, said saw being disposed in the space between said elongated members in straddled relation therewith in the mounted position of said elongated members on said carrier to prevent accidental manual access to said saw during the entire longitudinal movement of said carrier relative thereto, said slotted members including vertical slots to permit guiding said elongated members into said vertical varying positions.

3. A device adapted to be mounted for longitudinal movement relative to a rotating power operated saw, comprising a work supporting carrier having means permitting the passage of the saw therethrough for the cutting of the work supported thereon, means for securing the work to said carrier to prevent the movement thereof relative to said carrier, said work securing means comprising a plurality of threaded rods screwed into a plurality of threaded holes at a corresponding plurality of positions in said work supporting carrier, clamping means screwed on said rods, respectively, for movement on said rods to engage said work at varying distances from said work supporting carrier for the holding down of said work to said carrier, a guard for said saw, and means for mounting said guard on said carrier for movement therewith longitudinally of said saw, said guard comprising means enclosing the upper part of said saw during the entire movement of said carrier relative thereto to prevent accidental manual access to said saw during said movement.

4. A device adapted to be mounted for longitudinal movement relative to a rotating power operated saw, comprising a work supporting carrier having means permitting the passage of the saw therethrough for the cutting of the work supported thereon, a plurality of work guides having position adjusting slots therein, means for adjustably securing said guides to said work supporting carrier comprising a plurality of rods threadedly mounted at a corresponding plurality of positions on said carrier, said rods passing through said adjusting slots of said guides, means mounted for movement on said rods to engage said guides for the holding down thereof to said work supporting carrier, means for securing the work in abutment against said guides and in position on said work supporting carrier for the sawing thereof, a guard for said saw, and means for slidably guiding said guard into varying vertical positions on said carrier for movement therewith longitudinally of said saw, said guard being in abutting relation with the work on said carrier and being supported by the work when said work is supported on said carrier, said guard comprising means enclosing the upper part of said saw during the entire movement of said carrier relative thereto to prevent accidental manual access to said saw during said movement.

5. A device adapted to be mounted for longitudinal movement relative to a rotating power operated saw, comprising a work supporting carrier having means permitting the passage of the saw therethrough for the cutting of the work supported thereon, means proximate each end of said work carrier providing a hand grip for the manual actuation of said device relative to said saw at either end of said carrier, the space between said hand grips defining an area for the securement of the work to said carrier, a guard for said saw, and means near each end of said carrier for slidably guiding rectilinear movement of said guard into varying vertical positions on said carrier so that said guard is in abutting relation with the work and is movable with said carrier longitudinally of said saw, the work providing a support for said guard in the abutted position thereof.

6. A device adapted to be mounted for longitudinal movement relative to a rotating power operated saw, comprising a work supporting carrier having means permitting the passage of the saw therethrough for the cutting of the work supported thereon, means proximate each end of said work carrier providing a hand grip for the manual actuation of said device relative to said saw at either end of said carrier, said hand grip comprising a transversely extending vertical plate against which the work is placed for the positioning thereof, the space between said hand grips defining an area for the securement of the work to said carrier, a guard for said saw, and means near each end of said carrier for slidably guiding rectilinear movement of said guard into varying vertical positions on said carrier so that said guard is in abutting relation with the work and is movable with said carrier longitudinally of said saw, the work providing a support for said guard in the abutted position thereof.

7. A device adapted to be mounted for longitudinal movement relative to a rotating power operated saw, comprising a work supporting carrier having means permitting the passage of the saw therethrough for the cutting of the work supported thereon, means proximate each end of said work carrier providing a hand grip for the manual actuation of said device relative to said saw at either end of said carrier, the space between said hand grips defining an area for the securement of work to said carrier, a guard for said saw, and means for slidably guiding said guard into varying vertical positions on said carrier for movement therewith longitudinally of said saw, said slidably guiding means comprising a slotted member mounted on each of said hand grips of said carrier, said guard being disposed in vertical slots of said slotted members and being in abutting relation with the work on said carrier when said work is supported on said carrier, whereby the work provides a support for said guard, said guard comprising means enclosing the upper part of said saw during the entire movement of said carrier relative thereto to prevent accidental manual access to said saw during said movement.

8. A device adapted to be mounted for longitudinal movement relative to a rotating power operated saw, comprising a work supporting carrier, said carrier comprising two plates in spaced relation to define a slot therebetween permitting the passage of the saw therethrough for the cutting of the work supported thereon, means proximate each end of said work carrier providing a hand grip for the manual actuation of said device relative to said saw at either end of said carrier, the space between said hand grips defining an area for the securement of work to said carrier, a guard for said saw, and means for slidably guiding said guard into varying vertical positions on said carrier for movement therewith longitudinally of said saw, said slidably guiding means comprising a slotted member mounted on each of said hand grips of said carrier, said guard being disposed in vertical slots of said slotted members and being in abutting relation with the work on said carrier when said work is supported on said carrier, whereby the work provides a support for said guard, each of said slotted members having vertical slots therein for the passage of the saw therethrough, said guard comprising means enclosing the upper part of said saw during the entire movement of said carrier relative thereto to prevent accidental manual access to said saw during said movement.

9. A device adapted to be mounted for longitudinal movement relative to a rotating power operated saw, comprising a work supporting carrier having means permitting the passage of the saw therethrough for the cutting of the work supported thereon, means proximate each end of said work carrier providing a hand grip for the manual actuation of said device relative to said saw at either end of said carrier, the space between said hand grips defining an area for the securement of work to said carrier, a guard for said saw comprising a pair of elongated transparent members in spaced relation to each other and coextensive with said carrier, and means for slidably guiding said guard into varying vertical positions on said carrier, for movement therewith longitudinally of said saw, said slidably guiding means comprising a slotted member mounted on each of said hand grips of said carrier, said guard being disposed in vertical slots of said slotted members and being in abutting relation with the work on said carrier when said work is supported on said carrier to prevent accidental manual access to said saw during the entire longitudinal movement of said carrier relative thereto, the work providing a support for said guard in the abutted position thereof.

10. A device adapted to be mounted for longitudinal movement relative to a rotating power operated saw, comprising a work supporting carrier having means permitting the passage of the saw therethrough for the cutting of the work supported thereon, means proximate each end of said work carrier providing a hand grip for the manual actuation of said device relative to said saw at either end of said carrier, means for securing the work to said carrier to prevent the movement thereof relative to said carrier, said work securing means comprising a plurality of rods threadedly mounted at a corresponding plurality of positions in said work supporting carrier, means mounted for movement respectively on said rods for holding down the work to said work supporting carrier, a guard for said saw comprising a pair of elongated transparent members in spaced relation to each other and coextensive with said carrier, and means for slidably guiding said guard into varying vertical positions on said carrier for movement therewith longitudinally of said saw, said slidably guiding means comprising a slotted member mounted on each of said hand grips of said carrier, said guard being disposed in vertical slots of said slotted members and being in abutting relation with the work on said carrier when said work is supported on said carrier to prevent accidental manual access to said saw during the entire longitudinal movement of said carrier relative thereto, the work providing a support for said guard in the abutted position thereof.

11. A device adapted to be mounted for longitudinal movement relative to a rotating power operated saw, comprising a work supporting carrier having means permitting the passage of the saw therethrough for the cutting of the work supported thereon, a plurality of work guides having position adjusting slots therein, means for adjustably securing said guides to said work supporting carrier comprising a plurality of rods threadedly mounted at a corresponding plurality of positions on said carrier, said rods passing through the adjusting slots of said guides, means mounted for movement on said rods to engage said guides for the holding down thereof to said work supporting carrier, means for securing the work in abutment against said guides and in position on said work supporting carrier for the sawing thereof comprising a plurality of rods threadedly mounted at a corresponding plurality of positions on said work supporting carrier and means mounted for movement on said rods to engage said work for the holding down thereof to said work supporting carrier, a guard for said carrier comprising a pair of elongated transparent members in spaced relation to each other and coextensive with said carrier, and means for slidably guiding said guard into varying vertical positions on said carrier for movement therewith longitudinally of said saw, said slidably guiding means comprising a slotted member mounted at each end of said carrier, said guard being disposed in vertical slots of said slotted members and being in abutting relation with the work on said carrier when said work is supported thereon to prevent accidental manual access to said saw during the entire longitudinal movement of said carrier relative thereto, the work providing a support for said guard in the abutted position thereof.

12. In a power operated saw having a frame on which the saw is mounted for operation, a carrier adapted to be mounted for movement on said frame relative to said saw for the cutting of work supported thereon, comprising a work supporting surface, means for mounting the work to said surface at various positions thereon comprising at least one clamping member, said clamping member having a threaded hole therein and having a flat surface for engaging the surface of the work during the clamping thereof to said work supporting surface, means for mounting said clamping member at said various positions on said work supporting surface, said work supporting surface having at least one threaded hole therein at one of said various positions, said mounting means comprising a threaded rod screwed into said threaded hole in said work supporting surface and having said clamping member screwed thereon with the work disposed between said clamping member and said work supporting surface for the clamping thereof to said work supporting surface, the position of said clamping member on said threaded rod with respect to said work supporting surface being adjustable to accommodate various sizes of work.

13. In a power operated saw having a frame on which the saw is mounted for operation, a work supporting carrier mounted for movement on said frame relative to said saw for the cutting of work supported on the surface of said carrier, a guard comprising a pair of elongated spaced members coextensive with said carrier, means for movably mounting said guard on said carrier, said spaced members being in juxtaposition with the sides, respectively, of said saw in said mounted position of said guard, said guard mounting means comprising a slotted member mounted at each end of said carrier, each of said slotted members having a vertical slot for positioning an end of said guard therein for guiding said guard in varying vertical adjustable movement from said surface of said carrier for placing the lower edges of said spaced members on the upper surface of the work, whereby said work supports said guard at varying vertical distances from said surface of said carrier.

14. In a power operated saw having a frame on which the saw is mounted for operation, a work supporting carrier mounted for movement on said frame relative to said saw for the cutting of work supported on the surface of said carrier, a guard comprising a pair of elongated spaced members coextensive with said carrier, means for mounting said guard on said carrier for rectilinear movement with respect to said carrier with said spaced members in juxtaposition with the sides, respectively, of said saw, said guard mounting means including spaced means for guiding vertical adjustable movement of said elongated spaced members near each end thereof for positioning said members at varying vertical distances from said surface of said carrier with the lower edges of said spaced members resting on the upper surface of the work, whereby said work supports said guard at said varying vertical distances.

References Cited in the file of this patent
UNITED STATES PATENTS

| | | |
|---|---|---|
| 161,392 | Dodd | Mar. 30, 1875 |
| 1,275,807 | Wells | Aug. 13, 1918 |
| 1,422,316 | Spiller | July 11, 1922 |
| 1,452,233 | Zsuffa | Apr. 17, 1923 |
| 1,872,388 | Bazzoni | Aug. 16, 1932 |
| 2,085,235 | Tautz | June 29, 1937 |
| 2,441,378 | Zielinski | May 11, 1948 |
| 2,789,596 | Barnes et al. | Apr. 23, 1957 |
| 2,881,812 | Alumbaugh et al. | Apr. 14, 1959 |

FOREIGN PATENTS

| | | |
|---|---|---|
| 2767/26 | Australia | July 13, 1926 |
| 62,252 | Denmark | May 15, 1944 |
| 936,091 | France | Feb. 16, 1948 |
| 621,423 | Great Britain | Apr. 8, 1949 |